(12) United States Patent
Engelhardt

(10) Patent No.: US 7,274,506 B2
(45) Date of Patent: Sep. 25, 2007

(54) ADJUSTMENT OF A MICROSCOPE

(75) Inventor: Johann Engelhardt, Bad Schönborn (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 11/327,783

(22) Filed: Jan. 6, 2006

(65) Prior Publication Data

US 2006/0109547 A1  May 25, 2006

Related U.S. Application Data

(63) Continuation of application No. PCT/EP04/07362, filed on Jul. 6, 2004.

(30) Foreign Application Priority Data

Jul. 11, 2003 (DE) ................... 103 31 501

(51) Int. Cl.
*G02B 21/18* (2006.01)
(52) U.S. Cl. ............... 359/370; 359/368; 359/383; 359/385

(58) Field of Classification Search ............ 359/368, 359/370, 383, 385
See application file for complete search history.

(56) References Cited

U.S. PATENT DOCUMENTS

| | | | |
|---|---|---|---|
| 3,825,349 A | 7/1974 | Nomarski | 356/107 |
| 5,671,085 A | 9/1997 | Gustafsson et al. | 359/385 |
| 6,862,137 B2 * | 3/2005 | Ott | 359/388 |
| 2004/0114225 A1 | 6/2004 | Engelhardt et al. | 359/385 |

FOREIGN PATENT DOCUMENTS

| | | |
|---|---|---|
| DE | 4040441 A1 | 7/1992 |
| DE | 19914049 A1 | 10/2000 |
| EP | 0491289 B1 | 4/1996 |

* cited by examiner

*Primary Examiner*—Joshua L Pritchett
(74) *Attorney, Agent, or Firm*—Thomas, Kayden, Horstemeyer & Risley LLP

(57) ABSTRACT

In adjusting a microscope having at least two objectives for superimposing measuring beams of light in an object space to the end of obtaining an interference pattern and for monitoring the object space, each objective having a focal point, a focal plane and a pupil, auxiliary beams of light which are distinguishable from the measuring beams are directed into the objectives, and the auxiliary beams getting back out of the objectives are superimposed to obtain an auxiliary interference pattern. Further, the auxiliary beams getting back out of the objectives are imaged as spots.

25 Claims, 7 Drawing Sheets

US 7,274,506 B2

ADJUSTMENT OF A MICROSCOPE

CROSS REFERENCE TO RELATED APPLICATIONS

This application is a continuation of International Application PCT/EP2004/007362 with an International Filing Date of Jul. 6, 2004 and claiming priority to co-pending German Patent Application No. 103 17 613.6 entitled "Justierung eines Mikroskops", filed on Jul. 11, 2003.

FIELD OF THE INVENTION

The invention generally relates to a method of adjusting a microscope and to a microscope having a surveillance unit for a state of adjustment of the microscope. More particular the invention relates to adjusting a microscope having at least two objectives for superimposing measuring beams in an object space to obtain an interference pattern and for monitoring the object space.

BACKGROUND OF THE INVENTION

When a plurality of measuring beams is superimposed in an object space to obtain an interference pattern, this normally has the purpose to delimit an optical excitation or de-excitation in the object space to the areas of the intensity maxima of the interference pattern. In this way, a very high spatial resolution is achieved in exciting or de-exciting. In such microscopes, the required precision of the adjustment which is a pre-condition for a proper function of the microscope is very high. Actual criteria which have to be fulfilled in adjusting such microscopes include the mutual coverage of the spots of the measuring beams within a common focal plane of the objectives. With pulsed measuring beams or measuring beams of very short coherence lengths this coverage has to be ensured both spatially and temporally. Further demands with regard to the adjustment arise, if the interference pattern shall be moved for scanning a sample in the object space. Then, the phase plane of the measuring beams has additionally to be kept constant within the common focal plane of the objectives. Depending on the desired imaging mode, the relative phase of the measuring beams has to be kept constant to obtain an intensity maximum or intensity minimum always exactly in the middle of the interference pattern at the focal plane. In some cases, the phase has also to be adjusted dependently on the position in the object space to compensate for differences in the diffraction number or other particulars of a sample. If the interference pattern shall be identical over a broad wave length range of the measuring beams, even dispersion differences of the measuring beams have to be compensated for. As the wave lengths of the measuring beams used are typically smaller than 1 µm, the requirements with regard to the mechanical precision of the microscopes used are very high. Upon changing a sample, a high number of the adjustments previously made are lost. Further, thermal influences onto the microscope can neither be reduced nor reproduced to such an extent that fully constant conditions could be achieved over a longer period of time of many minutes or of even some hours. Further factors influencing an adjustment once achieved are drifts of sensors, actuators and further system components. Correspondingly, the operation of microscopes like they are for example used for 4 Pi-microscopy known from European Patent EP 491 289 B1 or in I5M-microscopy known from U.S. Pat. No. 5,671,085 require much time besides a high level of expertise.

It is a generally known aid for adjusting an optical system to direct well defined visible beams of light into the system to visualize the state of adjustment of the optical system by the visible paths of the beams of light.

In US-Patent Application published as US 2004/114225 A1 it is mentioned that a light source for generating an auxiliary path of beams may be used for adjusting the components of a microscope and that the auxiliary path of beams may be generated as an interferometric path of beams. However there is no disclosure with regard to the construction of the auxiliary path of beams and the formation of any interference pattern with this auxiliary path of beams.

Thus, there is a need for a method of adjusting a microscope and a microscope having a surveillance unit, with which the adjustment of a microscope by using auxiliary beams can be further simplified and even made automatically.

SUMMARY OF THE INVENTION

In one aspect, the invention provides a method of adjusting a microscope having at least two objectives for superimposing measuring beams of light in an object space to the end of obtaining an interference pattern and for monitoring the object space, each objective having a focal point, a focal plane and a pupil, the method comprising the steps of: directing auxiliary beams of light which are distinguishable from the measuring beams into the objectives, the auxiliary beams being focused through the objectives into the focal points of the objectives; superimposing the auxiliary beams getting back out of the objectives within a common image of the pupils of the objectives to obtain an auxiliary interference pattern; and additionally imaging the auxiliary beams getting back out of the objectives as spots in a common image of the focal planes of the objectives.

In a further aspect, the invention provides a method of adjusting a microscope having at least two objectives for superimposing measuring beams of light in an object space to the end of obtaining an interference pattern and for monitoring the object space, each objective having a focal point, a focal plane and a pupil, the method comprising the steps of: directing auxiliary beams of light which are distinguishable from the measuring beams into the objectives, the auxiliary beams being focused through the objectives into the pupils of the objectives; superimposing the auxiliary beams getting back out of the objectives within a common image of the focal planes of the objectives for obtaining an auxiliary interference pattern; and additionally imaging the auxiliary beams getting back out of the objectives as spots in a common image of the pupils of the objectives.

In another aspect the invention provides a microscope comprising a light source emitting a light beam, a beam splitter splitting up the light beam into a plurality of measuring beams, a plurality of objectives superimposing the plurality of measuring beams in an object space for obtaining an interference pattern and for monitoring the object space, and a surveillance unit for monitoring the state of adjustment of the microscope, each objective having a focal point, a focal plane and a pupil, said surveillance unit comprising: an auxiliary light source arranged and designed to direct an auxiliary light beam into said beam splitter in such a way that said beam splitter splits up the auxiliary light beam into auxiliary beams of light which get into said objectives, said auxiliary light source directing the auxiliary light beam into said beam splitter in such a way that the auxiliary beams are focused by said objectives into the focal points of said objectives; an auxiliary superimposing optic arranged and designed to superimpose the auxiliary beams getting back out of said objectives and being merged by said beam splitter in a common image of the pupils of said objectives for obtaining an auxiliary interference pattern; and an auxiliary imaging optic arranged and designed to additionally image the auxiliary beams getting back out of said objectives and being merged by said beam splitter as spots in a common image of the focal planes of said objectives.

In still a further aspect the invention provides a microscope comprising a light source emitting a light beam, a beam splitter splitting up the light beam into a plurality of measuring beams, a plurality of objectives superimposing the plurality of measuring beams in an object space for obtaining an interference pattern and for monitoring the object space, and a surveillance unit for monitoring the state of adjustment of the microscope, each objective having a focal point, a focal plane and a pupil, said surveillance unit comprising: an auxiliary light source arranged and designed to direct an auxiliary light beam into said beam splitter in such a way that said beam splitter splits up the auxiliary light beam into further auxiliary beams of light which get into said objectives, said auxiliary light source directing the auxiliary light beam into said beam splitter in such a way that the auxiliary beams are focused by said objectives into the pupils of said objectives; an auxiliary superimposing optic arranged and designed to superimpose the auxiliary beams getting back out of said objectives and being merged by said beam splitter in a common image of the focal planes of said objectives for obtaining an auxiliary interference pattern; and an auxiliary imaging optic arranged and designed to additionally image the auxiliary beams getting back out of said objectives and being merged by said beam splitter as spots in a common image of the pupils of said objectives.

According to both aspects of the new method, auxiliary beams distinguishable from the measuring beams are directed into the objectives, and the auxiliary beams emerging from the objectives again are superimposed to obtain an interference pattern. That the auxiliary beams get back out of the objectives or emerge from the objectives again has the meaning that they get out of the objectives or emerge from the objectives at the backside of the objectives, i.e. at that side, at which the auxiliary beams have been directed into the objectives. Thus, the interference pattern to which the auxiliary beams getting back out of the objectives are superimposed is no interference pattern which is formed in the object space. Instead, it is an auxiliary interference pattern which is generated outside the object space and, from a point of view in the object space, on the other side of the objectives. Depending on the way, how the auxiliary beams are directed into the objectives, such an interference pattern allows for certain statements on various aspects of the adjustment of the respective microscope. The differences between the auxiliary beams and the measuring beams allows for directing or focussing the auxiliary beams in another way than the measuring beams. Further, the auxiliary beams can be discriminated from the measuring beams so that the new method can even be carried out during measuring a sample with the measuring beams. There are very different ways in which the measuring beams can be distinguished from the auxiliary beams. For example, they may have different wave length, they may be present at different points in time, or they may only be directed into the objectives or focused in different ways.

When the auxiliary beams are focused through the objectives into the focal points of the objectives and when the auxiliary beams getting out of the objectives again are superimposed in a common image of the pupils of the objectives according to one of the two variants of the new method, interference stripes appear in the interference pattern which indicate de-adjustments of the optical axis of the objectives of a little percentage of the diameter of the auxiliary beams which are focused down to the diffraction limit at a very high sensitivity. Further, curvatures of the interference stripes indicate up aberrations which may, for example, be caused by a sample in the object space.

For pre-adjusting the objectives in a lateral direction, the auxiliary beams getting back out of the objectives, which are focused into the focal points of the objectives, are additionally imaged as spots in a common image of the focal planes of the objectives in the one of the two variants of the new method. In this image the spots have to be brought to a full coverage to achieve a basic adjustment of the microscope. The fine adjustment can then be made using the interference pattern to which the auxiliary beams getting back out of the objectives are superimposed in a common image of the pupils of the objectives.

As a supplement, the axial adjustment can also be assessed with the same auxiliary beams in that the auxiliary beams getting out of the objectives again are additionally imaged in a common image of the focal planes of the objectives onto at least one confocal detector. If the pinhole aperture providing the confocallity is arranged in a plane conjugated to the desired common focal plane of the objectives, the detector only detects such intensities of lights originating from this particular axial area. Thus, it is possible to determine with the confocal detector which intensities of light of the auxiliary beams come back out of the area of the focal plane about which the auxiliary beams also form an interference pattern in the object space. A signal which is additionally dependent on the direction of an axial offset is obtained, when two confocal detectors are used which are conjugated to different parallel planes, like for example in front of and behind the common focal plane of the objectives, or if the position of the confocal detector or the image imaged onto the confocal detector is modulated axially so that the point conjugated to the confocal detector scans a certain axial area.

According to the other of the two variants of the new method, the auxiliary beams are focused into the pupils of the objectives, and the auxiliary beams emerging from the objectives again are superimposed in a common image of the focal planes of the objectives for obtaining an interference pattern. The interference pattern then provides information about the adjustment of the phase planes of the beams superimposed in the object space.

For coarse adjustment of the phase planes, the auxiliary beams getting out of the objectives again are additionally imaged as spots in a common image of the pupils of the objectives in the other of the two variants of the new method. Here again, the spots have to be brought to full mutual coverage in a first step.

If spots are imaged in the new method, not only differences in position of the spots but also blur of the individual spots can be noticed and eliminated. This also provides for a means for a simplified adjustment of a microscope.

If measuring beams produced by short pulse lasers are to be brought to interference within the object space or if even the interference of fluorescence is required like in case of 4 Pi-type C-images, then the absolute beam paths of the measuring beams have to be adjusted to identical values within a few micrometers. To this end, a mirror object can be located within the object space at that place at which the sample is located later on, which mirror object reflects all beams of light which emerge out of any of the objectives into the object space in an exactly opposite direction back into the same respective objective. If then a spectrally broadband auxiliary light beam having a coherence length of a few μm only, particularly of less than 25 μm, is split up into the two auxiliary beams which are directed into the objectives, and if the interference pattern of the auxiliary beams getting out of the objectives again is analysed spectrally, the desired interference pattern is only formed, if the path lengths of the auxiliary beams and thus the optical path lengths of the measuring beams in the microscope are identical within the coherence length of the auxiliary beams. Additionally, the spectrally broadband auxiliary beam results into that the auxiliary beam is spectrally split up within the interference pattern so far as dispersion differences are present between the interfering optical beam paths. On this basis, the dispersions can be adjusted for example by means of glass wedges. Thus, in 4 Pi-type-C imaging, the illuminating beams and detection beams of different wave lengths can be adjusted to a certain phase.

The common images which are produced in the various embodiments of the new method can be visualized at an enlarged scale to obtain an optical representation of the adjustment state which can be used for manually adjusting the microscope. The common images may, however also be automatically analyzed by image processing. To this end, the images may be imaged onto optical or picture sensors like, for example, CCD-sensors.

Some interference patterns which are produced in the new method from auxiliary beams getting back out of the objectives may, however, also be registered by a simple four quadrant diode as there are no interference stripes at all in the optimally adjusted state of the microscope and as, when this state of adjustment is lost, first interference stripes appear in the border area of the interference pattern. For determining the appearance and the position of these interference stripes a four quadrant diode is sufficient.

To determine the direction of a variation within a microscope which results into a loss of adjustment, at least one of the auxiliary beams can be axially or laterally modulated with regard to its position. The sign of the observed change in the adjustment state can be determined from the sign of the modulation and the direction of the observed effect.

Any modulation of the auxiliary beams is preferably synchronized with a scanner of the microscope to avoid any effects based on an asynchronous superimposition of the modulations.

In a microscope according to the invention the plurality of measuring beams is produced from one beam of light by means of a beam splitter. This beam splitter also splits up an auxiliary light beam into the auxiliary beams of light and merges the auxiliary beams again after they got out of the objectives again. Then, any desired interference pattern is produces. It is to be understood that the auxiliary light source must have a certain coherence length. For all embodiments of the invention besides the adjustment of the beam path length and the dispersion, a monochromatic light source, like for example a laser, is preferred.

For the spectral analysis of an interference pattern which is produced with the aid of a spatially broadband light source of short coherence length, preferably a spectrometer is provided which is tuned to the light source with regard to the spectral range.

Further preferred embodiments of the new microscope appear from the previous description of the new method or they can be taken from the following description of the figures.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
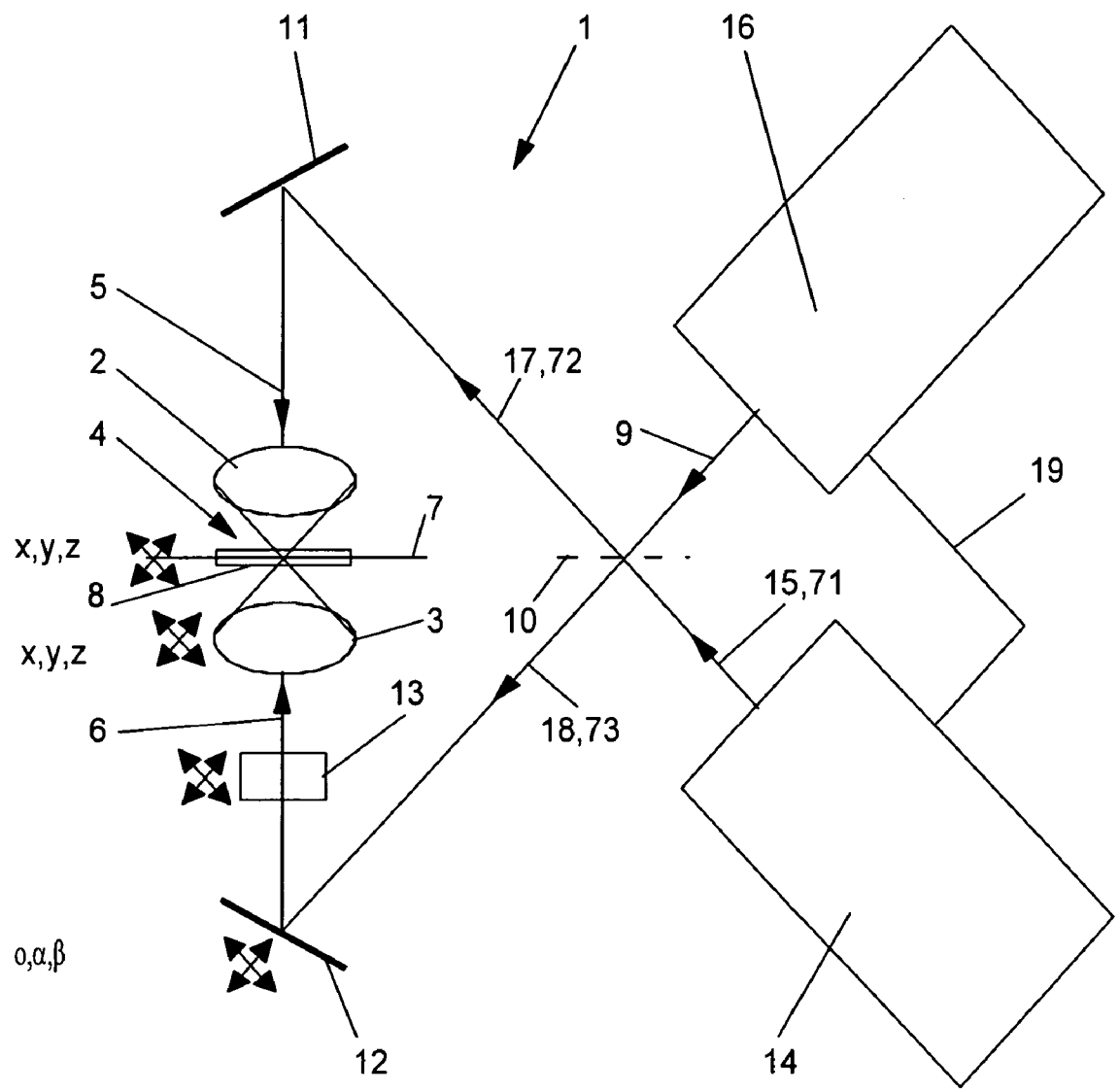
FIG. 1 shows the general construction of a 4 Pi-microscope according to the invention.

Referring now in greater detail to the drawings, FIG. 1 illustrates the construction of a 4 Pi-microscope as one of a plurality of embodiment examples of a microscope 1 with two objectives 2 and 3. The objectives 2 and 3 superimpose two measuring beams of light 5 and 6 in an object space 4 to produce an interference pattern around a common focal plane 7 of the objectives 2 and 3. In the center of the interference pattern which is located there where the interference pattern is intersected by the focal plane 7, there may be an interference minimum or an interference maximum. By the light intensities in the interference pattern a sample 8 which is arranged in the area of the focal plane 7 is optically excited or depleted within spatially narrowly limited areas only. The objectives 2 and 3 at the same time serve for monitoring the sample 8 in directions opposite to the measuring beams 5 and 6. The measuring beams 5 and 6 are produced from a coherent light beam 9 by means of a beam splitter 10, and they are directed into the objectives 2 and 3 with the aid of mirrors 11 and 12. The arrangement of the components of the microscope 1 comprises a plurality of variables which are to be tuned to certain values to assure a proper function of the microscope 1. Assuming a fixed position of the objective 2 and of the associated mirror 11, the position of the sample with regard to these components is variable in x, y and z direction. Further, the position of the objective is variable in x, y and z direction; the dispersion of the measuring beam 6, which can be varied by means of a dispersion adjustment unit 13, is variable with regard to the measuring beam 5, and the phase of the measuring beam 6, which can be varied in all three space dimensions be means of a mirror 12, is variable with regard to the measuring beam 5. In practice, a lot of these variables are also correlated so that the adjustment of the microscope 1 is highly complicated. Further, the adjustment gets lost to a far extent upon every change of the sample. As a result, even highly qualified personal is only able to measure a small number of samples within a certain period of time. To simplify the adjustment of the microscope 1 and to even allow for an automatic adjustment, a surveillance unit 14 for the state of adjustment of the microscope 1 is provided here according to the present invention. The surveillance unit 14 emits an auxiliary light beam 15 which differs from the light beam 9 coming from a measuring unit 16. The auxiliary light beam 15 is split up into auxiliary beams of light 17 and 18 by the same beam splitter 10 which splits up the light beam 9 into the measuring beams 5 and 6. The auxiliary beams 17 and 18 take the same path through the microscope 1 as the measuring beams 5 and 6. After running through the objectives 2 and 3 they return to the beam splitter 10; they are merged by the beam splitter 10; and they then return into the surveillance unit 14. Because of their nature, they can be distinguished from light from the sample 8 which is received by the measuring unit 16 as a result of the light beam 9. The distinguishability may be due to different wave lengths but also due to different points in time of the light beams 9 and 15. Typically the light beam 9 is a pulsed laser beam of high power density, whereas the auxiliary light beam 15 is a continuous beam of low power density. In the following Figures various possible details of the surveillance unit 14 are described. The surveillance unit 14 may operate actuators which are not depicted here and which change the variables of the arrangement of the microscope 1 to the end of completely adjusting the microscope 1 based on the presently determined state of adjustment of the microscope 1. No other intervention in the function of the microscope 1 is made, i.e. its function is not disturbed. A depicted connection line 19 between the surveillance unit 14 and the measuring unit 16 indicates that any modulations within the surveillance unit 14 which have an effect on the auxiliary light beam 15 or on any of its parts, i.e. any of the auxiliary beams 17, 18, are synchronized with modulations within or controlled by the measuring unit 16 to avoid undesired interferences of these modulations.

Figure 2:
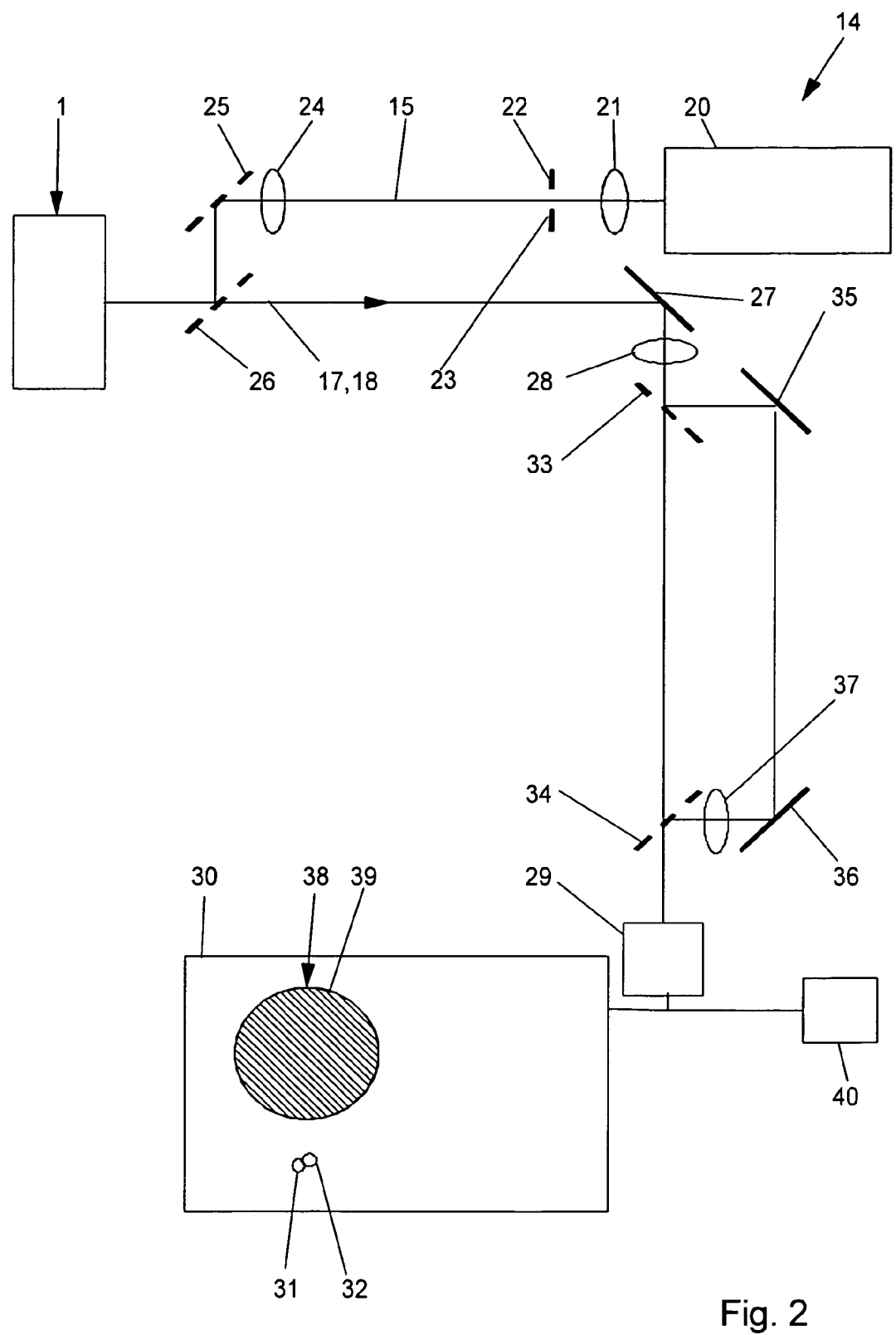
FIG. 2 shows a surveillance unit for use in combination with the 4 Pi-microscope depicted in FIG. 1 and for executing a first embodiment of the new method.

FIG. 2 shows the first embodiment of the surveillance unit 214 according to FIG. 1. Here, the microscope 1 is only schematically depicted as a box. The auxiliary light beam 15 coming from a laser 20 is directed into the microscope 1. Prior to that, the auxiliary light beam 15 is focused with one or a plurality of lenses 21 onto a pinhole aperture 22 to form a point shaped light source 23. Afterwards the auxiliary light beam 15 is formed by one or a plurality of lenses 24 in such a way that it is focused by the objectives 2 and 3 according to FIG. 1 into their focal points within their common focal plane 7 according to FIG. 1. The auxiliary light beam 15 is directed into the microscope 1 via two beam splitters 25 and 26. The beam splitter 25 could also be a mirror. The surveillance unit 214 according to FIG. 2, however, is designed to be provided as a part of a more complex surveillance unit in which the beam splitter 25 is required. Preferably, beam splitters are used which have a thickness at which parasitic reflexes are positioned outside the beam diameter used. Astigmatic errors which may occur because of this thickness can be minimized by additional compensation plates (not depicted here). The auxiliary beams 17 and 18 getting back out of the objectives 2 and 3 which are merged by the beam splitter 10 according to FIG. 1 return back into the surveillance unit 214 according to FIG. 2. Here, they are imaged behind the beam splitter 26 via a mirror 27 and one or a plurality of lenses 28 onto a picture sensor 29 as an enlarged image of the focal planes of the objectives 2 and 3 according to FIG. 1. This results into two spots 31, 32 in the image 30 taken with the picture sensor 29, which are associated with the auxiliary beams 17, 18. When the focal points of both objectives 2 and 3 are brought to coincidence, which is required for the formation of the desired interference pattern from the measuring beams 5 and 6, the spots 31 and 32 also mutually cover each other. By means of focusing the spots 31 and 32, the focal planes of the objectives 2 and 3 according to FIG. 1 are adjusted with regard to each other in an axial direction. Further, both auxiliary beams 17, 18 are partially deviated via beam splitters 33 and 34 as well as mirrors 35 and 36, and these parts of the auxiliary beams 17, 18 are then merged with the remaining parts of the auxiliary beams 17, 18 again. The deviated parts of both auxiliary beams 17, 18 are superimposed in an image of the pupils of the objectives 2 and 3 according to FIG. 1 onto the picture sensor 29 by means of one or a plurality of lenses 37. This results into an interference pattern 38 within the image 38. Interference stripes 39 of the interference pattern 38 indicate lateral de-adjustments of the focal points of both objectives 2 and 3 at a high sensitivity of a few percent of the diameter of the focal points. Further, aberrations which may be introduced by the sample 8 according to FIG. 1 can be recognized by curvatures of the interference stripes. An optimum state of adjustment is achieved, when the interference stripes 39 disappear. The evaluation of the image 30 and the deduced adjustment of the microscope 1 can be done by image processing with the aid of a computer 40. In the following, an example of such an adjustment based on the image 30 is explained with reference to various states of adjustment.

Figure 3:
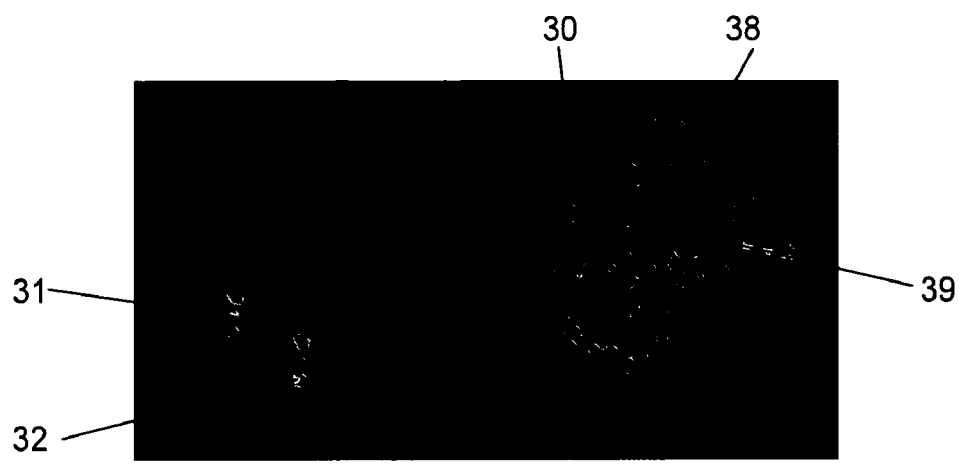
FIG. 3 shows an image displayed by the surveillance unit according to FIG. 2 at the beginning of the adjustment of the 4 Pi-microscope.

FIG. 3 shows the image 30 according to FIG. 2 which has been taken during a real adjustment process at the beginning of the adjustment. The spots 31 and 32 are arranged side by side. However, they are already focused. The interference pattern 38 shows a plurality of interference stripes 39. Even with a worse de-adjustment of the microscope the spots 31 and 32 are still visible. However, they then have a higher distance. The interference stripes 39 of the interference pattern 38 are, however, so narrow then, that they can no longer be resolved.

Figure 4:
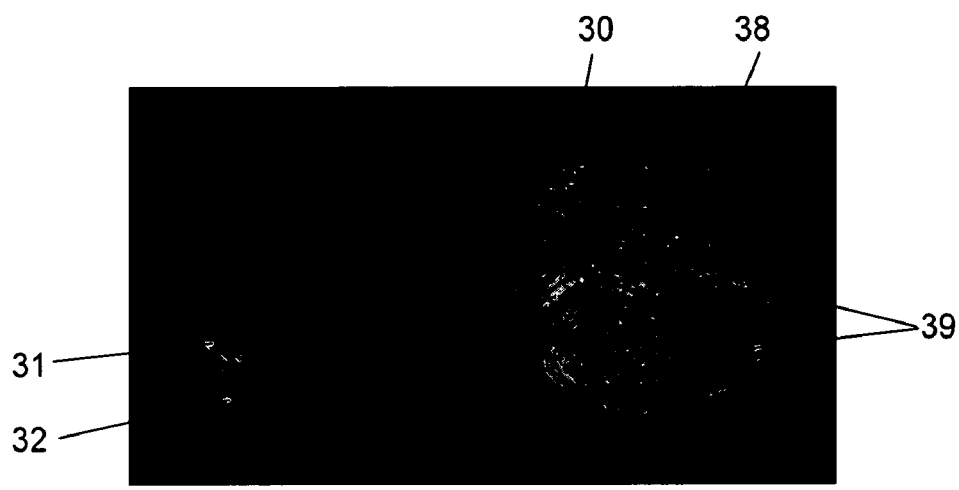
FIG. 4 shows an image corresponding to FIG. 3 during the adjustment of the 4 Pi-microscope.

The image 30 according to FIG. 4 was taken after enhancing the adjustment with regard to FIG. 3. The spots 31 and 32 begin to overlap. The stripes 39 of the interference pattern 38 are reduced in their number and get broader. With a nearly perfect adjustment there is only one dark stripe left at the border of the interference pattern 38. This will be further explained with reference to FIG. 6.

Figure 5:
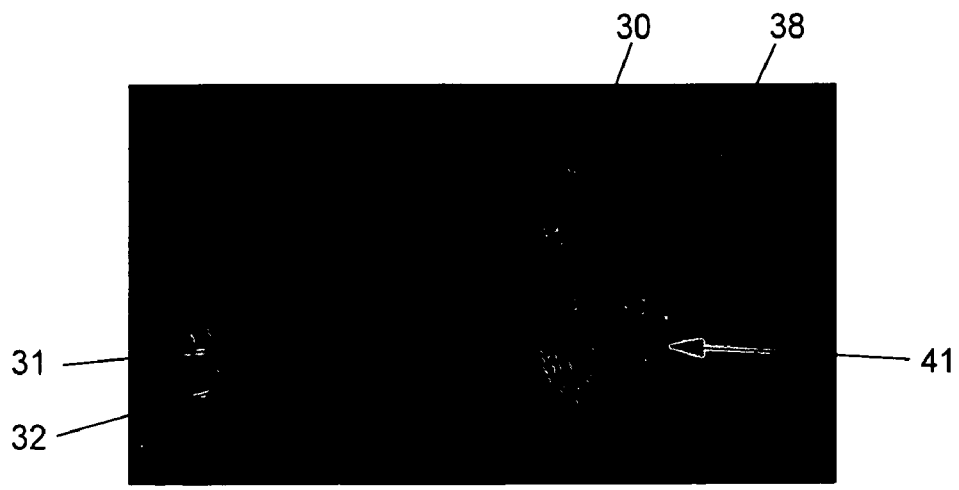
FIG. 5 shows an image corresponding to FIG. 3 and FIG. 4 after the adjustment of the 4 Pi-microscope.

FIG. 5 shows the image 30 after the adjustment has been completed. The spots 31 and 32 are mutually covering each other. The interference pattern 38 shows no more interference stripes. The structure 41 still visible in the interference pattern is due to parasitic reflexes in the optics.

Figure 6:
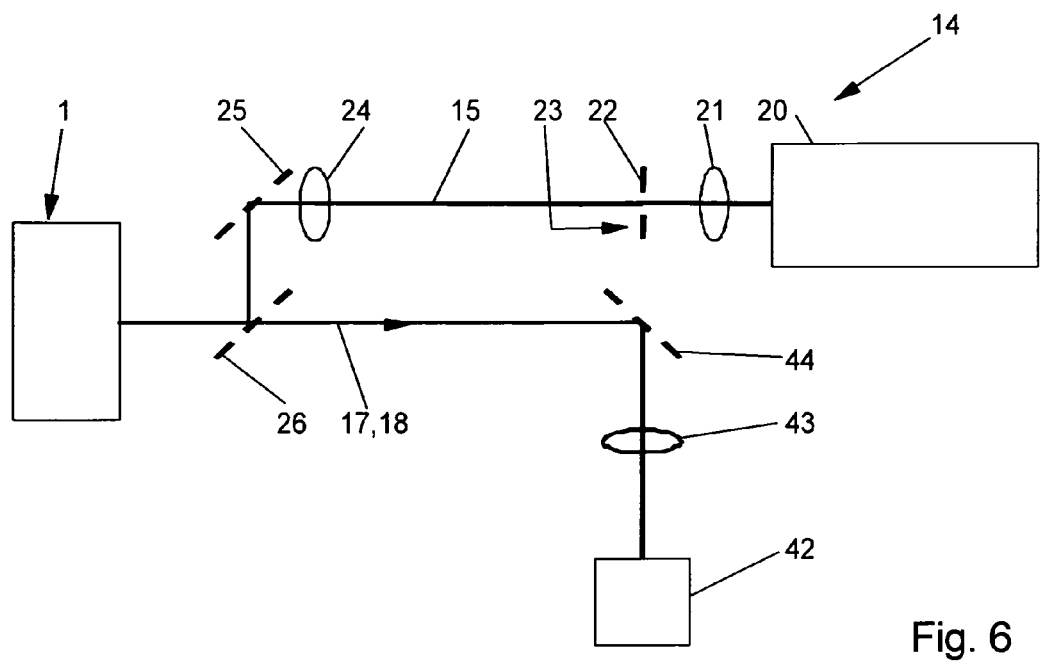
FIG. 6 shows a variant of the surveillance unit according to FIG. 2 for surveying the lateral beam position in the 4 Pi-microscope.

As leaving the state of perfect adjustment is associated with a first dark stripe appearing at the border of the interference pattern 38 free of stripes according to FIG. 5, the state of optimum adjustment can be surveyed with a four quadrant diode 42, like it is illustrated in FIG. 6. A part of the auxiliary beams 17, 18 separated by a beam splitter 44 is imaged onto a four quadrant diode 42 with one or a plurality of lenses 43 in a way corresponding to imaging the interference pattern 38. The four quadrant diode 42 registers the darkening in the border of the interference pattern 38 according to FIG. 5 already beginning with the slightest de-adjustment of the microscope. The four quadrant diode 42 also registers the direction out of which the dark stripe comes into the interference pattern 38 according to FIG. 5. Because of the symmetry of the arrangement of the microscope 1, however, this does not provide for a signal which is suitable for a stabilizing control of the beam path of the microscope 1. Such a signal, however, can easily be obtained in that at least one of the auxiliary beams is laterally modulated to a slight extent. This also modulates the signal of the four quadrant diode 42. As a consequence, the sign of the de-adjustment can be determined by synchronously demodulating the signal of the four quadrant diode 42. A modulation of a few percent of the focus diameter of the objectives 2 and 3 is sufficient. To avoid image disturbances each modulation made for the surveillance unit 14 is synchronized with modulations of a scanner of the measuring unit 16 according to FIG. 1.

Figure 7:
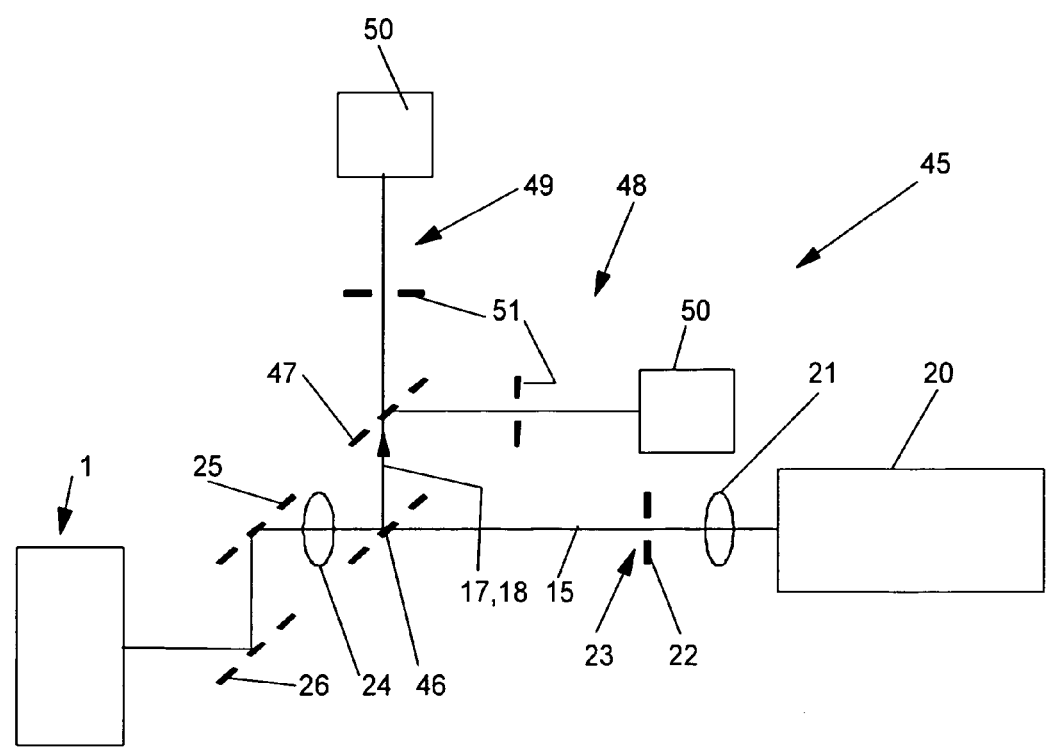
FIG. 7 shows a surveillance unit for surveying the axial beam position which may be provided as a supplement to the surveillance unit according to FIG. 2.

FIG. 7 depicts the construction of a supplemental unit 45 by which a signal for an axial stabilization of the beam paths of the microscope 1 is obtained. To this end, parts of the auxiliary beams 17, 18 coming back from the microscope 1 are deviated with a beam splitter 46 between the point light source 23 and the lens 24, and they are projected by means of a further beam splitter 47 onto two confocal detectors 48 and 49, which both comprise a pinhole aperture 51 besides a light sensor 50. The points in the object space 4 according to FIG. 1, which are conjugated to the pinhole apertures 51 of the confocal detectors 48 and 49 have axial positions slightly in front and behind of the ideal position of the focal points. In the ideal case of a complete adjustment of the microscope 1, both confocal detectors 48 and 49 should output a signal of the same amplitude. An occurring difference of the signals can directly be used as a control signal to adjust the axial distance of the objectives and to keep this distant constant, for example, by means of a PID-controller. The sign of a difference of the signals provided by the confocal detectors 48 and 49 indicates the direction of the required correction. The lens 24 may be used to compensate for axial color errors of the objectives in that the lens 24 is moved axially. It is to be pointed out that the arrangement of FIG. 7 is not used for focusing an objective onto an object. It is thus not the usual auto focus arrangement known from literature. Instead of the difference signal from two confocal detectors 48 and 49, a focusing element, like for example the lens 24 can be modulated axially, i.e. with regard to its position in axial direction, and a control signal can be obtained from the thus modulated detection signal by means of only one confocal detector. Advantageously the modulation is again synchronized with the measuring unit 16 according to FIG. 1.

Figure 8:
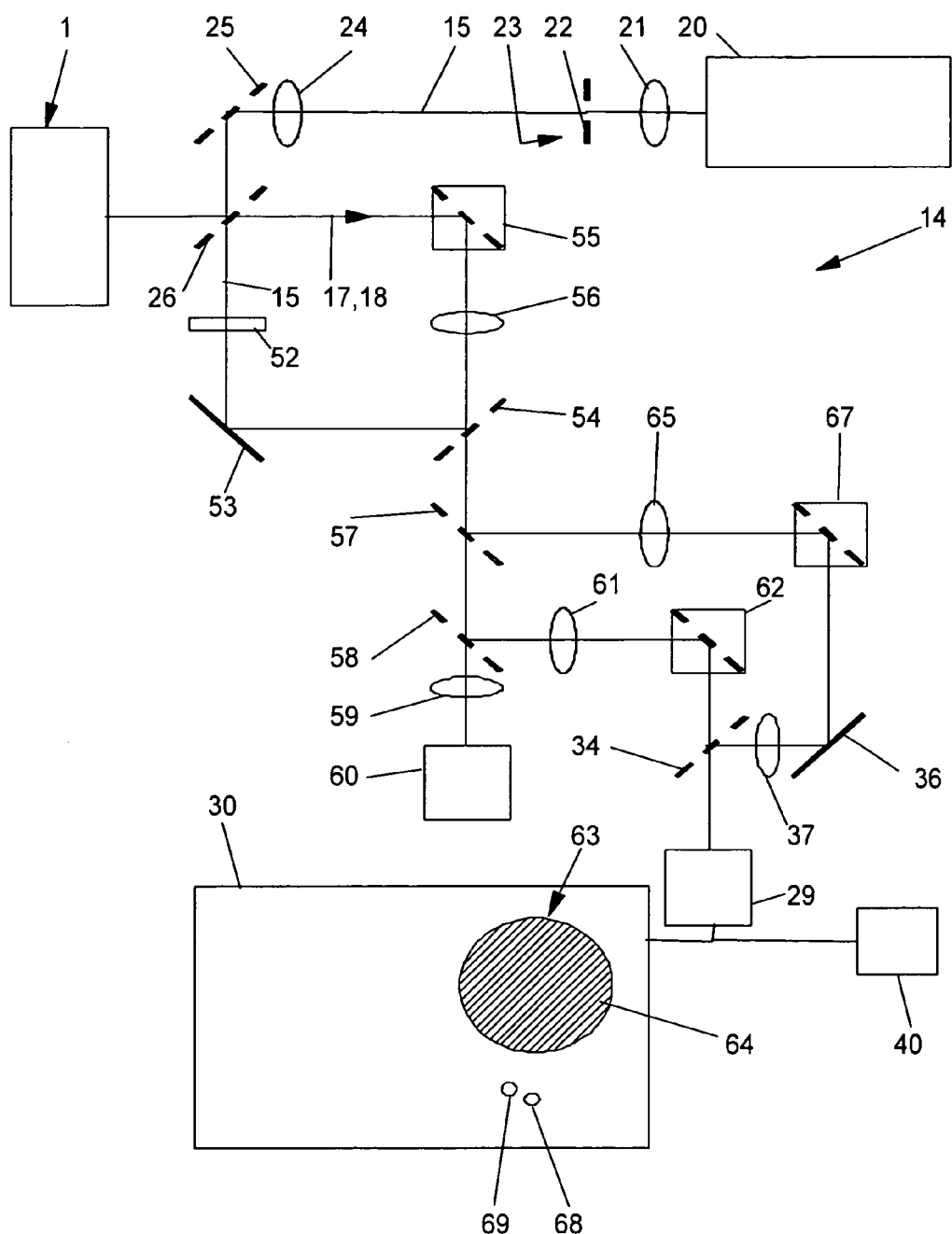
FIG. 8 shows a further surveillance unit for use with the 4 Pi-microscope according to FIG. 1 and for executing a further embodiment of the new method.

FIG. 8 depicts a further embodiment of the surveillance unit 814. The construction of this surveillance unit is more complicated than absolutely necessary, because the surveillance unit 814 according to FIG. 8 is designed for a combination with the surveillance unit 214 of FIG. 2 in such a way that there is only one common picture sensor 29. I.e. only one single image 30 will be taken in which various images are arranged side by side. Correspondingly, the beam paths of the surveillance units 214 of FIG. 2 and 814 of FIG. 8 have to be merged in front of the picture sensor 29. Particularly, the surveillance unit 814 according to FIG. 8 serves for adjusting the phase plane of the measuring beams which are superimposed by the microscope 1 in the object space. To this end, a part of the auxiliary beam 15 is polarized behind the beam splitter 26 by means of a lambda/2 plate in such a way that it is, after deviation by a mirror 53 and a beam splitter 54, directed via a polarization beam splitter 55 through the beam splitter 26 into the microscope 1. Here, one or a plurality of lenses 56 are arranged in the beam path in such a way that the auxiliary beams 17, 18 are focused in the microscope 1 into the pupils of the objectives 2 and 3 according to FIG. 1. The corresponding parts of the auxiliary beams 17, 18 coming back out of the microscope are selectively deviated by the polarization beam splitter 55 behind the beam splitter 26, and the get through the lens 56 and the beam splitter 54 to a further beam splitter 57. The beam splitter 57 splits the auxiliary beams 17, 18 up into those parts which are deviated for imaging the pupils of the objectives 2 and 3 according to FIG. 1, and into further parts which run through for imaging the common focal plane 7 of the objectives 2 and 3 according to FIG. 1. The parts running through are further split up by a beam splitter 58. The parts running through the bean splitter 58 are imaged onto a four quadrant diode 60 by one or a plurality of lenses 59 as an image of the focal plane of the objectives 2 and 3. The parts of the auxiliary beams 17, 18 deviated by the beam splitter 58 are imaged onto the picture sensor 29 by one or a plurality of lenses 61 also in an image of the focal planes of the objectives 2 and 3. Here, they are deviated by a polarization beam splitter 62. This image results into an interference pattern 63 with interference stripes 64 which allows for a fine adjustment of the pupils of the objectives with regard to each other, during which the interference stripes 64 get broader and totally disappear at the end. The surveillance of the adjustment achieved in this way takes place with the aid of the four quadrant diode 60. The process which is applied here in principle corresponds to the lateral beam stabilization explained with reference to FIGS. 2 to 6. For a coarse adjustment of the pupils, the parts of the auxiliary beams 17, 18 deviated by the beam splitter 57 are imaged onto the picture sensor 29 by one or a plurality of lenses 65 and the lens 57 in an image of the pupils. Here, deviations occur at a polarization beam splitter 67, the mirror 36 and the beam splitter 34. This imaging results in two spots 68 and 69 in the image 30 which have at first to be focused and which are then to be brought to full mutual coverage. The corresponding adjustment of the microscope 1 can be made by an operator of the microscope 1 again either based on a visualization of the image 30, or the computer 40 makes the corresponding adjustments of the microscope 1 automatically based on image processing of the image 30 and the signal of the four quadrant diode 60.

Figure 9:
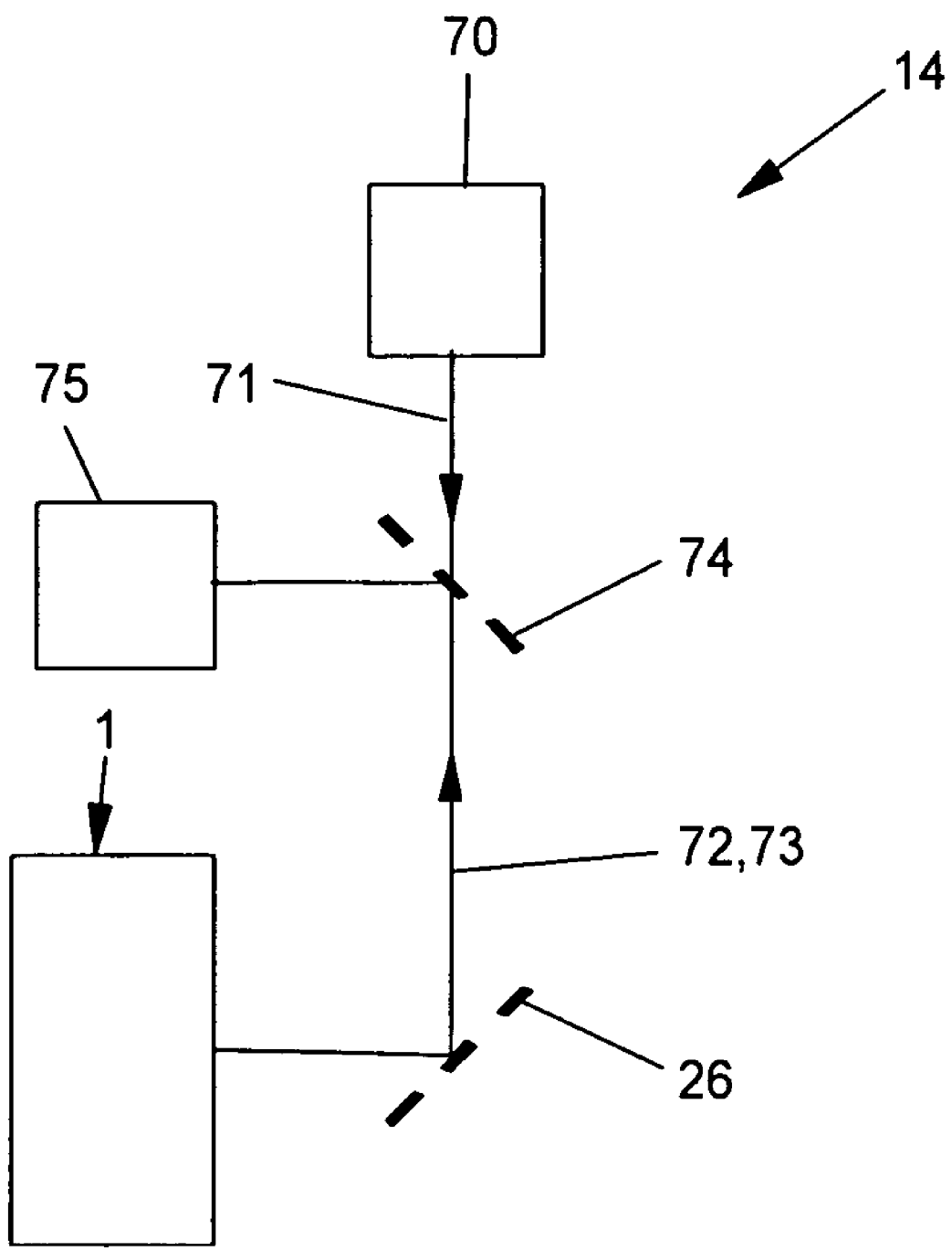
FIG. 9 shows a further surveillance unit for use with the 4 Pi-microscope according to FIG. 1 and for executing a further embodiment of the new method.

FIG. 9 illustrates a further possible embodiment of the surveillance unit 914, for the use of which a mirror object with two mirror surfaces running in parallel to the focal plane 7 has to be arranged at the place of the sample 8 in the object space 4 according to FIG. 1. In the surveillance unit 14, a light emitting diode (LED) 70 serves as a light source for a spectrally broadband auxiliary light beam 71 of short coherence length of only a few micrometers. Particularly, the LED 70 may emit white light. The auxiliary light beam 71 is directed through the beam splitter 26 into the microscope 1; and the auxiliary beams 72, 73, which are merged again and returning from the microscope 1 are projected onto a spectrometer 75 via the beam splitter 26 and a further beam splitter 24. Here, an interference pattern of the auxiliary beams 72, 73 is only formed then, when the optical path lengths of both auxiliary beams 72, 73 starting at the beam splitter 10 according to FIG. 1 and running to the mirror object and back are identical within the coherence length of the LED 70. Additionally, the wave length dependency of the interference pattern indicates differences with regard to dispersion. Thus, an adjustment of the dispersion can be made based on the signal of the spectrometer 75.

Figures 10, 11:
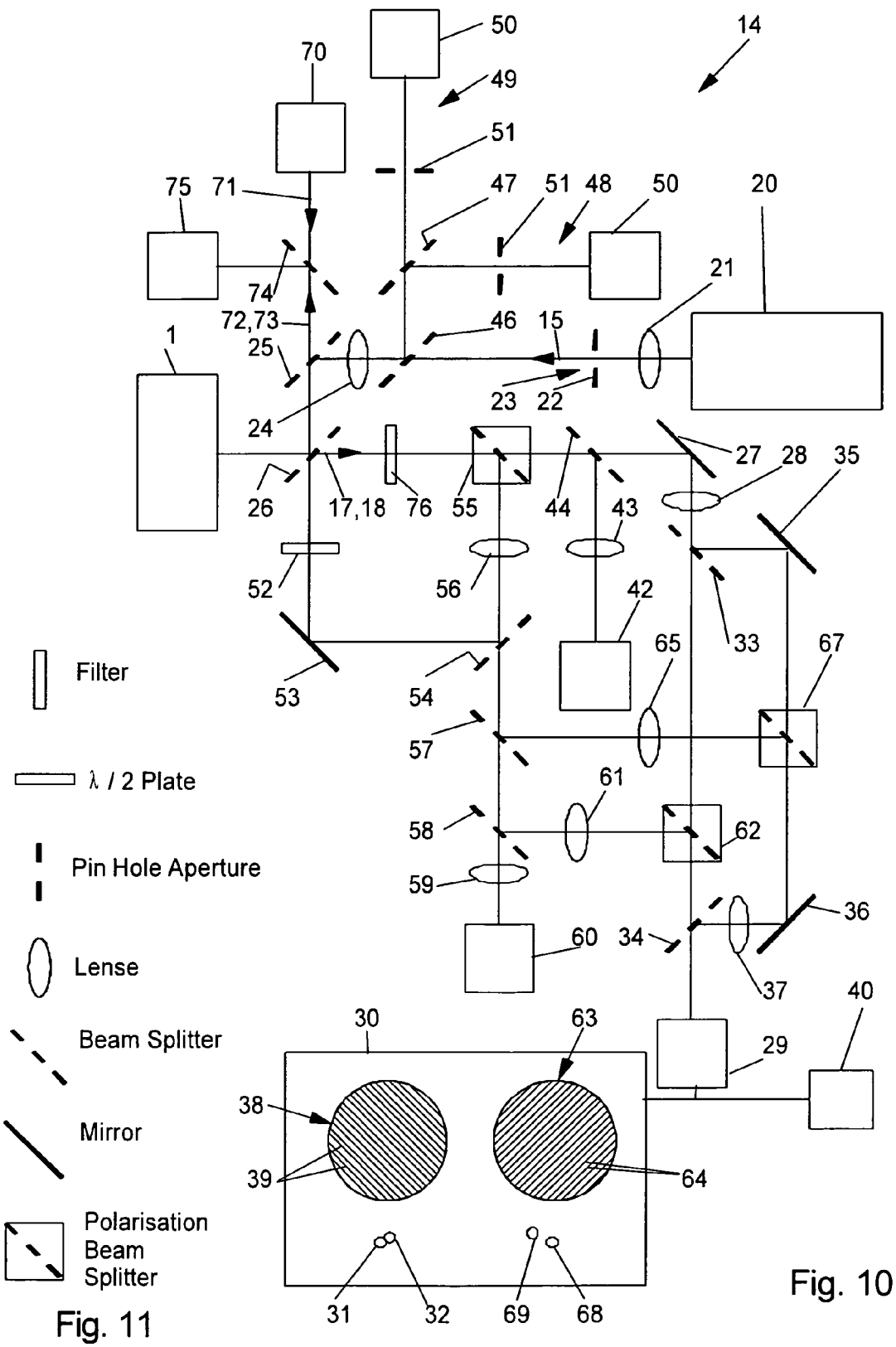
FIG. 10 shows a surveillance unit for the 4Pi-microscope according to FIG. 1 incorporating the surveillance units according to FIG. 2, FIG. 6, FIG. 7, FIG. 8 and FIG. 9.
FIG. 11 is a legend of the drawing symbols by which optical elements are depicted in FIG. 1 and FIG. 2 as well as in FIG. 6 to FIG. 10.

FIG. 10 shows a surveillance unit 114 in which all surveillance units are combined which have been described with reference to FIG. 2 and FIG. 6 to FIG. 9. The elements of each part of the surveillance unit 14 according to FIG. 10 are designated with the same reference numerals as in the previous Figures, so that it is possible to allocate each element to the surveillance units separately depicted in the previous Figures. The only additional part in the surveillance unit 114 according to FIG. 10 is a filter 76 for those parts of the auxiliary beams 17, 18 emerging from the microscope 1 again, which are not deviated by the beam splitter 26. The filter 26 is a notch filter having a transmission limited to the wave length of the laser 20. Thus, the filter cares for that neither the light from the LED 70 nor the light of the measuring beam 9 gets to the four quadrant diodes 42 and 46 and to the picture sensor 29. Similarly, corresponding filters could be provided in the beam path in front of the confocal detectors 48 and 49. The separation of the parts of the auxiliary light beam 15 coming from the laser 20 used for adjusting the focal planes on the one hand and used for adjusting the pupils on the other hand is accomplished by the polarization by means of the lambda/2 plate 52 and the polarization beam splitters 55, 62 and 67. The respective parts of the auxiliary light beam 15 and of the auxiliary beams 17, 18 resulting from it have orthogonal polarizations. Those skilled in the art, however, also no other ways to distinguish the single components of the auxiliary beams from each other, in particularly to distinguish the auxiliary beams from the measuring beams.

FIG. 11 is an overview over the symbols which are used in the Figures to depict certain optical components.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of adjusting a microscope having at least two objectives for superimposing measuring beams of light in an object space to the end of obtaining an interference pattern and for monitoring the object space, each objective having a focal point, a focal plane and a pupil, the method comprising the steps of:
    directing auxiliary beams of light which are distinguishable from the measuring beams into the objectives, the auxiliary beams being focused through the objectives into the focal points of the objectives, wherein the auxiliary beams and the measuring beams are distinguishable based on at least one of the following:
        the auxiliary beams and the measuring beams having different wavelengths; and
        the measuring beams comprising pulsed beams and the auxiliary beams comprising continuous beams,
    superimposing the auxiliary beams getting back out of the objectives within a common image of the pupils of the objectives to obtain an auxiliary interference pattern, and
    additionally imaging the auxiliary beams getting back out of the objectives as spots in a common image of the focal planes of the objectives.

2. The method of claim 1, comprising the further step of evaluating blur and differences in position of the spots in the common image of the focal planes of the objectives for determining the state of adjustment of the microscope.

3. The method of claim 1, wherein the auxiliary beams getting back out of the objectives are additionally imaged in an additional common image of the focal planes of the objectives onto at least one confocal detector.

4. The method of claim 1, further comprising the steps of:
    directing further auxiliary beams of light which are distinguishable from the measuring beams into the objectives, the further auxiliary beams being focused through the objectives into the pupils of the objectives,
    superimposing the further auxiliary beams getting back out of the objectives within a common image of the focal planes of the objectives for obtaining a further auxiliary interference pattern, and
    additionally imaging the further auxiliary beams getting back out of the objectives as spots in a common image of the pupils of the objectives.

5. The method of claim 4, comprising the further step of evaluating blur and differences in position of the spots in the common image of the pupils of the objectives for determining the state of adjustment of the microscope.

6. The method of claim 1, further comprising the steps of arranging a mirror object in the object space,
    dividing a spectral broadband auxiliary light beam having a coherence length of less than 25 μm up into supplemental auxiliary beams which are directed into the objectives,
    superimposing the supplemental auxiliary beams getting back out of the objectives for obtaining a supplemental auxiliary interference pattern, and
    spectrally analyzing the supplemental auxiliary interference pattern.

7. The method of claim 1, wherein at least one of the common images is visualized at an enlarged scale.

8. The method of claim 1, wherein at least one of the common images is analyzed by image processing.

9. The method of claim 1, wherein the auxiliary interference pattern is registered by a four quadrant diode.

10. The method of claim 1, wherein the microscope is adjusted automatically based on an evaluation of at least one of the common images.

11. The method of claim 1, wherein at least one of the auxiliary beams is modulated with regard to its position in at least one direction selected from axially and laterally.

12. The method of claim 11, wherein the modulation is synchronized with the scanner of the microscope.

13. A method of adjusting a microscope having at least two objectives for superimposing measuring beams of light in an object space to the end of obtaining an interference pattern and for monitoring the object space, each objective having a focal point, a focal plane and a pupil, the method comprising the steps of:

directing auxiliary beams of light which are distinguishable from the measuring beams into the objectives, the auxiliary beams being focused through the objectives into the pupils of the objectives, wherein the auxiliary beams and the measuring beams are distinguishable based on at least one of the following:

the auxiliary beams and the measuring beams having different wavelengths; and the measuring beams comprising pulsed beams and the auxiliary beams comprising continuous beams, superimposing the auxiliary beams getting back out of the objectives within a common image of the focal planes of the objectives for obtaining an auxiliary interference pattern, and additionally imaging the auxiliary beams getting back out of the objectives as spots in a common image of the pupils of the objectives.

14. The method of claim 13, comprising the further step of evaluating blur and differences in position of the spots in the common image of the pupils of the objectives for determining the state of adjustment of the microscope.

15. The method of claim 13, further comprising the steps of:

directing further auxiliary beams of light which are distinguishable from the measuring beams into the objectives, the further auxiliary beams being focused through the objectives into the focal points of the objectives, superimposing the further auxiliary beams getting back out of the objectives within a common image of the pupils of the objectives to obtain a further auxiliary interference pattern, and additionally imaging the further auxiliary beams getting back out of the objectives as spots in a further common image of the focal planes of the objectives.

16. The method of claim 15, comprising the further step of evaluating blur and differences in position of the spots in the common image of the pupils of the objectives for determining the state of adjustment of the microscope.

17. The method of claim 15, wherein the further auxiliary beams getting back out of the objectives are additionally imaged in an additional common image of the focal planes of the objectives onto at least one confocal detector.

18. The method of claim 13, further comprising the steps of arranging a mirror object in the object space, dividing a spectral broadband auxiliary light beam having a coherence length of less than 25 µm up into supplemental auxiliary beams which are directed into the objectives, superimposing the supplemental auxiliary beams getting back out of the objectives for obtaining a supplemental auxiliary interference pattern, and spectrally analyzing the supplemental auxiliary interference pattern.

19. The method of claim 13, wherein at least one of the common images is visualized at an enlarged scale.

20. The method of claim 13, wherein at least one of the common images is analyzed by image processing.

21. The method of claim 13, wherein the auxiliary interference pattern is registered by a four quadrant diode.

22. The method of claim 13, wherein the microscope is adjusted automatically based on an evaluation of at least one of the common images.

23. The method of claim 13, wherein at least one of the auxiliary beams is modulated with regard to its position in at least one direction selected from axially and laterally.

24. The method of claim 23, wherein the modulation is synchronized with the scanner of the microscope.

25. A method of adjusting a microscope having at least two objectives for superimposing measuring beams of light in an object space to the end of obtaining an interference pattern and for monitoring the object space, each objective having a focal point, a focal plane and a pupil, the method comprising the steps of:

directing auxiliary beams of light which are distinguishable from the measuring beams into the objectives, the auxiliary beams being focused through the objectives into the focal points of the objectives, wherein the auxiliary beams and the measuring beams are distinguishable based on at least one of the following:

the auxiliary beams and the measuring beams having different wavelengths; and the measuring beams comprising pulsed beams and the auxiliary beams comprising continuous beams, superimposing the auxiliary beams getting back out of the objectives within a common image of the pupils of the objectives to obtain an auxiliary interference pattern, and additionally imaging the auxiliary beams getting back out of the objectives as spots in a common image of the focal planes of the objectives;

directing further auxiliary beams of light which are distinguishable from the measuring beams into the objectives, the further auxiliary beams being focused through the objectives into the pupils of the objectives, superimposing the further auxiliary beams getting back out of the objectives within a common image of the focal planes of the objectives for obtaining a further auxiliary interference pattern, and additionally imaging the further auxiliary beams getting back out of the objectives as spots in a common image of the pupils of the objectives; and evaluating all of the common images for the present state of adjustment of the microscope.

* * * * *